(12) United States Patent
Lee et al.

(10) Patent No.: US 10,294,365 B2
(45) Date of Patent: *May 21, 2019

(54) POLYCARBONATE-BASED RESIN COMPOSITION AND MOLDED ARTICLE THEREOF

(71) Applicant: LG CHEM, LTD., Seoul (KR)

(72) Inventors: Su Kyoung Lee, Daejeon (KR); Min Ji Kim, Daejeon (KR); Jong Hyun Lee, Daejeon (KR); Ryul Lee, Daejeon (KR); Sung Tae Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/523,039

(22) PCT Filed: Dec. 3, 2015

(86) PCT No.: PCT/KR2015/013162
§ 371 (c)(1),
(2) Date: Apr. 28, 2017

(87) PCT Pub. No.: WO2016/089140
PCT Pub. Date: Jun. 9, 2016

(65) Prior Publication Data
US 2017/0321014 A1 Nov. 9, 2017

(30) Foreign Application Priority Data
Dec. 4, 2014 (KR) .................. 10-2014-0173005
Dec. 2, 2015 (KR) .................. 10-2015-0170789

(51) Int. Cl.
C08K 7/14 (2006.01)
C08L 69/00 (2006.01)
C08G 64/18 (2006.01)
C08G 64/38 (2006.01)
C08G 77/448 (2006.01)
C08J 5/00 (2006.01)
C08G 64/16 (2006.01)
C08G 64/06 (2006.01)
C08G 64/30 (2006.01)
C08G 64/08 (2006.01)
C08K 5/3475 (2006.01)
C08L 83/04 (2006.01)
C08G 64/24 (2006.01)
C08L 83/10 (2006.01)
C08K 5/00 (2006.01)
C08G 64/22 (2006.01)
C08G 77/14 (2006.01)
C08L 83/06 (2006.01)
C08J 5/08 (2006.01)
(Continued)

(52) U.S. Cl.
CPC .............. C08L 69/00 (2013.01); C08G 64/06 (2013.01); C08G 64/085 (2013.01); C08G 64/1666 (2013.01); C08G 64/1691 (2013.01); C08G 64/18 (2013.01); C08G 64/186 (2013.01); C08G 64/22 (2013.01); C08G 64/24 (2013.01); C08G 64/307 (2013.01); C08G 64/38 (2013.01); C08G 77/14 (2013.01); C08G 77/20 (2013.01); C08G 77/448 (2013.01); C08J 5/00 (2013.01); C08J 5/08 (2013.01); C08K 5/005 (2013.01); C08K 5/3475 (2013.01); C08K 5/42 (2013.01); C08K 5/521 (2013.01); C08L 51/04 (2013.01); C08L 69/005 (2013.01); C08L 83/04 (2013.01); C08L 83/06 (2013.01); C08L 83/10 (2013.01); C09K 21/14 (2013.01); C08K 3/40 (2013.01); C08K 7/14 (2013.01); C08K 2201/003 (2013.01); C08K 2201/004 (2013.01); C08K 2201/016 (2013.01); C08L 2201/08 (2013.01); C08L 2201/10 (2013.01); C08L 2205/02 (2013.01); C08L 2205/025 (2013.01); C08L 2205/03 (2013.01); C08L 2205/035 (2013.01); C08L 2205/05 (2013.01); C08L 2205/06 (2013.01); C08L 2207/53 (2013.01)

(58) Field of Classification Search
CPC .............. C08K 7/14; C08K 2201/1003; C08K 2201/004; C08K 2201/016; C08K 69/00
See application file for complete search history.

(56) References Cited

U.S. PATENT DOCUMENTS 3,819,744 A  6/1974 Buechner et al.
5,137,949 A  8/1992 Paul et al.
(Continued)

FOREIGN PATENT DOCUMENTS

CN  101124282 A  2/2008
CN  101585961 A  11/2009
(Continued)

OTHER PUBLICATIONS

Hwang, et al.: "Production of impact strength and fluidity-improved polycarbonate and composition comprising same", Chemical Abstract for US2016/0251481A1, Mar. 24, 2016.
(Continued)

Primary Examiner — Richard A Huhn
(74) Attorney, Agent, or Firm — Dentons US LLP

(57) ABSTRACT

The present invention relates to a polycarbonate-based resin composition and a molded article thereof, and more specifically, to a polycarbonate-based resin composition exhibiting improved impact strength (impact resistance) and chemical resistance while including a glass fiber in a relatively small content, and a molded article formed therefrom.

16 Claims, No Drawings

(51) Int. Cl.
*C08K 5/521* (2006.01)
*C08L 51/04* (2006.01)
*C08K 5/42* (2006.01)
*C09K 21/14* (2006.01)
*C08G 77/20* (2006.01)
*C08K 3/40* (2006.01)

(56) References Cited

U.S. PATENT DOCUMENTS

| | | | |
|---|---|---|---|
| 5,324,454 | A | 6/1994 | Takata et al. |
| 5,380,795 | A | 1/1995 | Gosens et al. |
| 5,455,310 | A | 10/1995 | Hoover et al. |
| 5,502,134 | A | 3/1996 | Okamoto et al. |
| 5,608,026 | A | 3/1997 | Hoover et al. |
| 5,783,651 | A | 7/1998 | König et al. |
| 5,932,677 | A | 8/1999 | Hoover et al. |
| 6,001,929 | A | 12/1999 | Nodera et al. |
| 6,252,013 | B1 | 6/2001 | Banach et al. |
| 6,281,286 | B1 | 8/2001 | Chorvath et al. |
| 6,780,956 | B2 | 8/2004 | Davis |
| 7,135,538 | B2 | 11/2006 | Glasgow et al. |
| 7,332,559 | B2 | 2/2008 | Hong et al. |
| 7,432,327 | B2 | 10/2008 | Glasgow |
| 7,498,401 | B2 | 3/2009 | Agarwal |
| 7,524,919 | B2 | 4/2009 | Hoover et al. |
| 7,691,304 | B2 | 4/2010 | Agarwal et al. |
| 7,709,581 | B2 | 5/2010 | Glasgow et al. |
| 7,718,733 | B2 | 5/2010 | Juikar et al. |
| 8,030,379 | B2 | 10/2011 | Nodera et al. |
| 8,084,134 | B2 | 12/2011 | Malinoski et al. |
| 8,124,683 | B2 | 2/2012 | Jung et al. |
| 8,389,648 | B2 | 3/2013 | Adoni et al. |
| 8,466,249 | B2 | 6/2013 | Gallucci et al. |
| 8,552,096 | B2 | 10/2013 | Li et al. |
| 8,912,290 | B2 | 12/2014 | Huggins et al. |
| 8,933,186 | B2 | 1/2015 | Bahn et al. |
| 8,962,780 | B2 | 2/2015 | Higaki et al. |
| 8,981,017 | B2 | 3/2015 | Ishikawa |
| 9,062,164 | B2 | 6/2015 | Kim et al. |
| 9,080,021 | B2 | 7/2015 | Ishikawa et al. |
| 9,102,832 | B2 | 8/2015 | Sybert et al. |
| 9,255,179 | B2 | 2/2016 | Park et al. |
| 9,505,929 | B2 | 11/2016 | Natarajan et al. |
| 9,580,597 | B2 | 2/2017 | Jeong et al. |
| 9,745,466 | B2 | 8/2017 | Park et al. |
| 9,840,585 | B2 | 12/2017 | Park et al. |
| 2003/0027905 | A1 | 2/2003 | Mahood et al. |
| 2003/0065122 | A1 | 4/2003 | Davis |
| 2004/0200303 | A1 | 10/2004 | Inoue et al. |
| 2006/0148986 | A1 | 7/2006 | Glasgow et al. |
| 2007/0093629 | A1 | 4/2007 | Silva et al. |
| 2007/0135569 | A1 | 6/2007 | Derudder |
| 2007/0241312 | A1 | 10/2007 | Hikosaka |
| 2007/0258412 | A1 | 11/2007 | Schilling et al. |
| 2008/0015289 | A1 | 1/2008 | Siripurapu |
| 2008/0081895 | A1 | 4/2008 | Lens et al. |
| 2008/0230751 | A1 | 9/2008 | Li et al. |
| 2009/0087761 | A1 | 4/2009 | Fukushima et al. |
| 2009/0326183 | A1 | 12/2009 | Schultz et al. |
| 2010/0233603 | A1 | 9/2010 | Hikosaka |
| 2012/0123034 | A1 | 5/2012 | Morizur et al. |
| 2012/0251750 | A1 | 10/2012 | Sybert et al. |
| 2012/0252985 | A1 | 10/2012 | Rosenquist et al. |
| 2012/0271009 | A1 | 10/2012 | Higaki et al. |
| 2012/0283393 | A1 | 11/2012 | Ishikawa |
| 2013/0035441 | A1 | 2/2013 | De Brouwer et al. |
| 2013/0082222 | A1 | 4/2013 | Aoki |
| 2013/0186799 | A1 | 7/2013 | Stam et al. |
| 2013/0190425 | A1 | 7/2013 | Zhu et al. |
| 2013/0267665 | A1 | 10/2013 | Huggins et al. |
| 2013/0274392 | A1 | 10/2013 | Morizur et al. |
| 2013/0289224 | A1 | 10/2013 | Bae et al. |
| 2013/0309474 | A1 | 11/2013 | Peek et al. |
| 2013/0313493 | A1 | 11/2013 | Wen et al. |
| 2013/0317142 | A1 | 11/2013 | Chen et al. |
| 2013/0317146 | A1 | 11/2013 | Li et al. |
| 2013/0317150 | A1 | 11/2013 | Wan et al. |
| 2013/0331492 | A1 | 12/2013 | Sharma |
| 2014/0058024 | A1* | 2/2014 | Son ............... C08K 5/521 |
| | | | 524/127 |
| 2014/0106208 | A1 | 4/2014 | Ishikawa et al. |
| 2014/0148559 | A1 | 5/2014 | Kim et al. |
| 2014/0179843 | A1 | 6/2014 | Van Der Mee et al. |
| 2014/0206802 | A1 | 7/2014 | Bahn et al. |
| 2014/0323623 | A1 | 10/2014 | Miyake et al. |
| 2015/0057423 | A1 | 2/2015 | Kim et al. |
| 2015/0175802 | A1 | 6/2015 | Sybert et al. |
| 2015/0197633 | A1 | 7/2015 | Van Der Mee et al. |
| 2015/0210854 | A1 | 7/2015 | Aoki |
| 2015/0218371 | A1 | 8/2015 | Lee et al. |
| 2015/0307706 | A1 | 10/2015 | Rosenquist et al. |
| 2015/0315380 | A1* | 11/2015 | Bahn ............... C08L 83/04 |
| | | | 524/352 |
| 2015/0344623 | A1* | 12/2015 | Park ............... C08G 64/1666 |
| | | | 528/29 |
| 2015/0368484 | A1 | 12/2015 | Shishaku et al. |
| 2016/0002410 | A1 | 1/2016 | Iyer et al. |
| 2016/0017102 | A1 | 1/2016 | Yamada |
| 2016/0122477 | A1 | 5/2016 | Rhee et al. |
| 2016/0251481 | A1 | 9/2016 | Hwang et al. |
| 2016/0297926 | A1 | 10/2016 | Hwang et al. |
| 2016/0319127 | A1 | 11/2016 | Jeong et al. |
| 2016/0326312 | A1 | 11/2016 | Park et al. |
| 2016/0326313 | A1 | 11/2016 | Son et al. |
| 2016/0326314 | A1 | 11/2016 | Son et al. |
| 2016/0326321 | A1 | 11/2016 | Park et al. |
| 2016/0369047 | A1 | 12/2016 | Hwang et al. |
| 2016/0369048 | A1 | 12/2016 | Park et al. |
| 2016/0369095 | A1 | 12/2016 | Park et al. |
| 2016/0376405 | A1 | 12/2016 | Park et al. |
| 2017/0137568 | A1 | 5/2017 | Chun et al. |
| 2017/0298222 | A1* | 10/2017 | Lee ............... C08G 64/24 |
| 2017/0306146 | A1* | 10/2017 | Lee ............... C08G 64/24 |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |

(56) References Cited

FOREIGN PATENT DOCUMENTS

| | | |
|---|---|---|
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| KR | 101664844 B1 | 10/2016 |
| TW | 201241043 A | 10/2012 |
| WO | 2012/060516 A1 | 5/2012 |
| WO | 2013/051557 A1 | 4/2013 |
| WO | 2013/058214 A1 | 4/2013 |
| WO | 2013-073709 A1 | 5/2013 |
| WO | 2013-100606 A1 | 7/2013 |
| WO | 2013-115538 A1 | 8/2013 |
| WO | 2013/115604 A1 | 8/2013 |
| WO | WO-2013115538 A1 * | 8/2013 ............ C08L 69/00 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014-139110 A1 | 9/2014 |
| WO | 2014/144673 A1 | 9/2014 |
| WO | 2014179206 A2 | 11/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |

OTHER PUBLICATIONS

Chemical Abstract registry No. 163617-00-3, Jun. 8, 1995.

* cited by examiner

POLYCARBONATE-BASED RESIN COMPOSITION AND MOLDED ARTICLE THEREOF

CROSS-REFERENCE TO RELATED APPLICATION

This application is a National Stage Entry of International Application No. PCT/KR2015/013162, filed Dec. 3, 2015, and claims the benefit of and priority to Korean Application No. 10-2014-0173005, filed on Dec. 4, 2014, and Korean Application No. 10-2015-0170789, filed on Dec. 2, 2015, all of which are hereby incorporated by reference in their entirety for all purposes as if fully set forth herein.

TECHNICAL FIELD

The present invention relates to a polycarbonate-based resin composition and a molded article thereof. More specifically, the present invention relates to a polycarbonate-based resin composition exhibiting improved impact strength (impact resistance) and chemical resistance while including a glass fiber in a relatively small content, and a molded article formed therefrom.

BACKGROUND

A polycarbonate resin is a thermoplastic resin formed by condensation-polymerization of an aromatic diol such as bisphenol A with a carbonate precursor such as a phosgene, and has excellent impact strength, dimensional stability, heat resistance, and transparency, etc. Thus, the polycarbonate resin has application in a wide range of uses, such as exterior materials of electrical and electronic products, automobile components, building materials, and optical components, etc.

In particular, when a glass fiber is reinforced in the polycarbonate resin, tensile/flexural strength, tensile/flexural modulus, and heat resistance, etc., may be improved, and thus, the polycarbonate resin may be appropriately used for products under constant load at high temperature. However, recently, as a level of physical properties such as impact strength (impact resistance), etc., required for the polycarbonate resin-based composition is increased, and it is difficult to achieve a desired level of physical properties by a general level of glass fiber reinforcement.

To solve this problem, a method of additionally using at least one impact-reinforcing agent in a general glass fiber-reinforced polycarbonate-based resin composition, a method of controlling an aspect ratio or surface treatment of the glass fiber to control adhesion property with the resin, and a method of increasing an added content of the glass fiber, etc., have been applied for a long time. However, there is a limitation in achieving a desired level of impact resistance or rigidity even by these methods. When the added content of the glass fiber is increased, there are disadvantageous in that protrusion of the glass fiber to a surface of a molded article, etc., occur, and thus, it is difficult to achieve recent continuous technical requirements for a beautiful appearance of the molded article and enlargement and slimness of the molded article.

In particular, resin molded articles which are recently applied to display products such as LCD, etc., and a smart phone, etc., are required to have a higher level of design excellence such as aesthetic appearance, etc., and required to be larger and slimmer and simultaneously have a higher level of physical properties such as impact resistance and chemical resistance, etc. Therefore, conventional methods have a significant difficulty in overally satisfying these requirements.

Due to these problems of the prior art, there is a continuing need to develop a polycarbonate-based resin composition including a glass fiber in a relatively small content to be capable of suppressing protrusion of a glass fiber, etc., and exhibiting improved impact strength (impact resistance) and chemical resistance, and related molded articles.

DISCLOSURE

Technical Problem

The present invention provides a polycarbonate-based resin composition having advantages of exhibiting improved impact strength (impact resistance) and chemical resistance while including a glass fiber in a relatively small content.

In addition, the present invention provides a molded article including the polycarbonate-based resin composition.

Technical Solution

An exemplary embodiment of the present invention provides a polycarbonate-based resin composition including a copolycarbonate resin including an aromatic polycarbonate-based first repeating unit, and an aromatic polycarbonate-based second repeating unit having one or more siloxane bonds, a glass fiber, and an impact-reinforcing agent including a rubber-modified vinyl-based graft copolymer, wherein the first repeating unit includes a repeating unit represented by Chemical Formula 1 below, and; the second repeating unit includes at least one repeating unit selected from the group consisting of Chemical Formula 3 below:

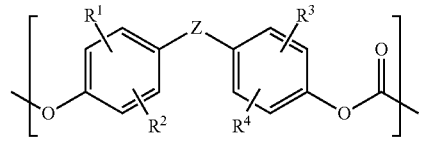

[Chemical Formula 1]

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO;

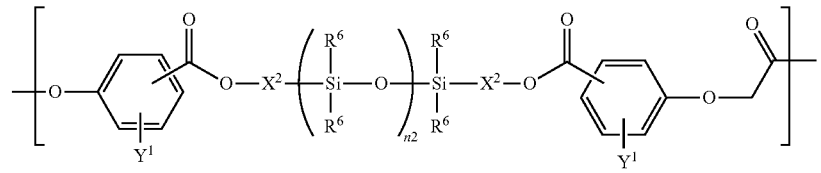

[Chemical Formula 3]

in Chemical Formula 3, $X^2$ is each independently $C_{1-10}$ alkylene, $Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n2 is an integer of 10 to 200.

Another exemplary embodiment of the present invention provides a molded article including the polycarbonate-based resin composition.

Hereinafter, the polycarbonate-based resin composition and the molded article thereof according to specific exemplary embodiments of the present invention are described in more detail.

[Chemical Formula 1]

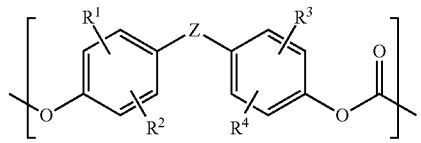

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO;

[Chemical Formula 3]

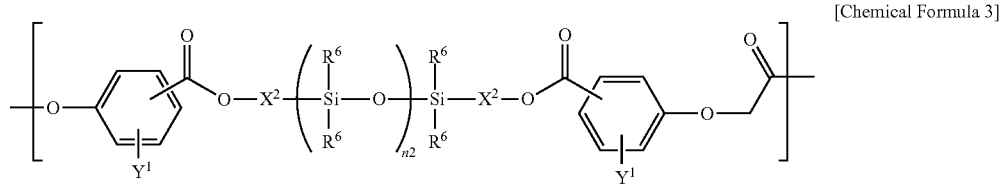

The technical terms used in the present specification intend to describe specific exemplary embodiments, but should not be interpreted as limiting the present invention. In addition, singular forms used herein include a plurality of forms unless the phrases have clearly opposite meanings.

In addition, term 'including' or 'containing' used in the present specification specifies specific characteristics, regions, integers, steps, operations, elements, or components, but it does not exclude the addition of other specific characteristics, regions, integers, steps, operations, elements, or components.

In addition, terms including ordinal numbers such as 'first', 'second', etc., in the present specification are used to distinguish one constituent element other constituent elements, and are not limited by the ordinal numbers. For example, first constituent elements may be referred to as second constituent elements within the scope range of the present invention, and similar to this, the second constituent elements may also be referred to as the first constituent elements.

I. Polycarbonate-based Resin Composition

According to an exemplary embodiment of the present invention, there is provided a polycarbonate-based resin composition including: a copolycarbonate resin including an aromatic polycarbonate-based first repeating unit, and an aromatic polycarbonate-based second repeating unit having one or more siloxane bonds, a glass fiber, and an impact-reinforcing agent including a rubber-modified vinyl-based graft copolymer, wherein the first repeating unit each independently includes a repeating unit represented by Chemical Formula 1 below, and; the second repeating unit includes at least one repeating unit selected from the group consisting of Chemical Formula 3 below:

in Chemical Formula 3, $X^2$ is each independently $C_{1-10}$ alkylene, $Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n2 is an integer of 10 to 200. In addition, in the composition of an exemplary embodiment, the second repeating unit of the copolycarbonate resin may further include at least one repeating unit selected from the group consisting of Chemical Formula 2 below:

[Chemical Formula 2]

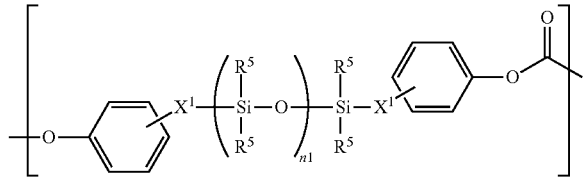

in Chemical Formula 2, $X^1$ is each independently $C_{1-10}$ alkylene, $R^5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n1 is an integer of 10 to 200.

As a result of continuous research, the present inventors found that when the resin composition according to an exemplary embodiment of the present invention includes a copolycarbonate resin in which a specific siloxane bond represented by Chemical Formula 3, more suitably, siloxane bonds represented by Chemical Formulas 2 and 3 are introduced into a polycarbonate main chain, physical properties of a general aromatic polycarbonate resin could be complemented, and thus, the resin composition could exhibit more excellent impact strength (impact resistance) or chemical resistance. Accordingly, the resin composition of an exemplary embodiment including the specific copolycarbonate resin may exhibit excellent physical properties such as impact resistance (impact strength) and chemical resistance, etc., that are improved than those previously known in the art even though the resin composition includes the glass fiber in a relatively low content and a conventional impact-reinforcing agent.

Therefore, it is possible to provide a molded article capable of solving problems such as protrusion of the glass fiber, etc., due to the increase in the added content of the glass fiber, etc., achieving the recently increasing requirements for enlargement/slimness and a beautiful appearance of the molded article, and exhibiting further improved general physical properties. Therefore, the resin composition of an exemplary embodiment and the molded article including the same may be preferably applied to various kinds of display products which are enlarged/slimmed, or various kinds of electronic products such as a smart phone, etc., or other various products.

Hereinafter, components that may be included in the polycarbonate-based resin composition according to an exemplary embodiment of the present invention are described in detail.

(1) Copolycarbonate Resin

The copolycarbonate resin is a component that is capable of improving physical properties, particularly, impact strength and chemical resistance, etc., of the existing aromatic polycarbonate resins, and may be included as a basic base resin in the resin composition of an exemplary embodiment. The copolycarbonate resin includes an aromatic polycarbonate-based first repeating unit, and an aromatic polycarbonate-based second repeating unit having one or more siloxane bonds.

That is, the copolycarbonate resin may be distinguished from a polycarbonate resin (for example, a polycarbonate resin only having an aromatic polycarbonate main chain without introduction of a polysiloxane structure) to be described below in that the polysiloxane structure is introduced into a main chain of the polycarbonate.

[First Repeating Unit]

Specifically, the aromatic polycarbonate-based first repeating unit is formed by a reaction of a diol compound and a carbonate precursor, and may include a repeating unit represented by Chemical Formula 1 below:

[Chemical Formula 1]

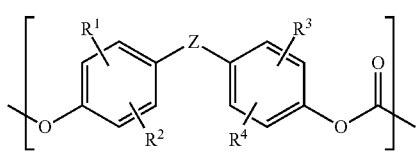

in Chemical Formula 1, $R^1$ to $R^4$ are each independently hydrogen, $C_{1-10}$ alkyl, $C_{1-10}$ alkoxy, or halogen, Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Here, $R^1$ to $R^4$ and Z may have the same as or different structure from a group corresponding to the above-described repeating unit including the polycarbonate resin.

As non-limiting example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

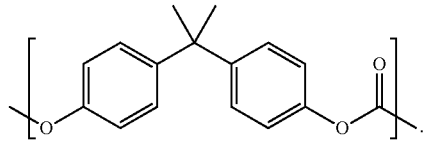

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromophosgene, and bishaloformate may be used. Preferably, triphosgene or phosgene may be used.

[Second Repeating Unit]

Meanwhile, the polycarbonate-based second repeating unit having one or more siloxane bonds is formed by a reaction of one or more siloxane compounds and a carbonate precursor. In a specific example, the polycarbonate-based second repeating unit having one or more siloxane bonds may include at least one repeating unit selected from the group consisting of Chemical Formula 3 below, and more preferably, may further include at least one repeating unit selected from the group consisting of Chemical Formula 2 below:

[Chemical Formula 2]

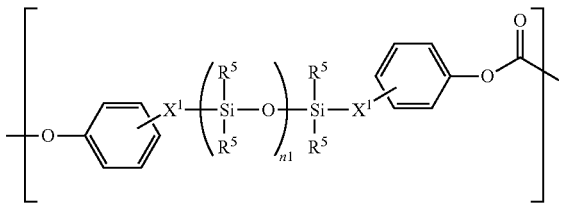

in Chemical Formula 2, $X^1$ is each independently $C_{1-10}$ alkylene, $R^5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n1 is an integer of 10 to 200;

[Chemical Formula 3]

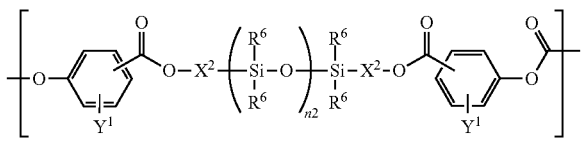

in Chemical Formula 3, $X^2$ is each independently $C_{1-10}$ alkylene, $Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n2 is an integer of 10 to 200. In Chemical Formula 2, $X^1$ may be each independently $C_{2-10}$ alkylene, preferably, $C_{2-4}$ alkylene, and more preferably, propane-1,3-diyl.

In Chemical Formula 2, $R^5$ may be each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. In addition, preferably, $R^5$ may be each independently $C_{1-10}$ alkyl, more preferably, $C_{1-6}$ alkyl, and more preferably, $C_{1-3}$ alkyl, and the most preferably, methyl.

In Chemical Formula 2, n1 is an integer of 10 to 200, preferably, may be i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less.

For example, the repeating unit represented by Chemical Formula 2 may be represented by Chemical Formula 2-1 below:

[Chemical Formula 2-1]

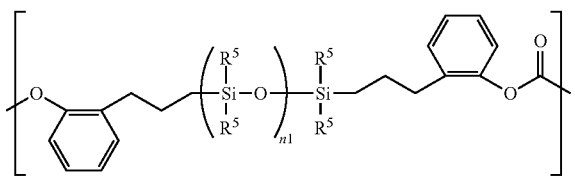

in Chemical Formula 2-1, $R^5$ and n1 are each the same as defined in Chemical Formula 2.

Further, in Chemical Formula 3, preferably, $X^2$ may be each independently $C_{2-10}$ alkylene, more preferably, $C_{2-6}$ alkylene, and the most preferably, isobutylene.

Preferably, in Chemical Formula 3, $Y^1$ may be hydrogen.

In Chemical Formula 3, $R^6$ may be each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. In addition, preferably, $R^6$ may be each independently $C_{1-10}$ alkyl, more preferably, $C_{1-6}$ alkyl, and more preferably, $C_{1-3}$ alkyl, and the most preferably, methyl.

In Chemical Formula 3, n2 is an integer of 10 to 200, preferably, may be i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less. For example, the repeating unit represented by Chemical Formula 3 may be represented by Chemical Formula 3-1 below:

in Chemical Formula 3-1, $R^6$ and n2 are each the same as defined in Chemical Formula 3 above.

According to an exemplary embodiment of the present invention, the copolycarbonate resin may include at least one repeating unit selected from the group consisting of Chemical Formula 3 above, and more suitably, may further include at least one repeating unit selected from the group consisting of Chemical Formula 2 above. In addition, the copolycarbonate resin may include at least two respective repeating units represented by Chemical Formula 2 and/or 3.

It may be confirmed that when the repeating units represented by Chemical Formulas 2 and 3 are included together or at least two respective repeating units are included together, degrees of improvement in room temperature impact strength, low temperature impact strength, and fluidity may be remarkably increased, which is because the degree of improvement in physical properties acts complementarily by the respective repeating units.

The description 'at least two repeating units' used herein means to include at least two repeating units each having a different structure within scopes of the respective Chemical Formulas, or at least two repeating units each having the same structure but having the different number of repeating units (n1 or n2) of silicon oxide in the structures of Chemical Formulas 2 and 3.

For example, the description 'at least two repeating units' used herein means i) one repeating unit represented by Chemical Formula 2 and another repeating unit represented by Chemical Formula 2, or ii) one repeating unit represented by Chemical Formula 3 and another repeating unit represented by Chemical Formula 3.

In each case including the two repeating units, a weight ratio of the two repeating units may be 1:99 to 99:1. Preferably, the weight ratio thereof may be 3:97 to 97:3, 5:95 to 95:5, 10:90 to 90:10, or 15:85 to 85:15, and more preferably, 20:80 to 80:20.

The repeating unit represented by Chemical Formula 2 and the repeating unit represented by Chemical Formula 3 may be derived from a siloxane compound represented by Chemical Formula 2-2 below and a siloxane compound represented by Chemical Formula 3-2 below, respectively:

[Chemical Formula 2-2]

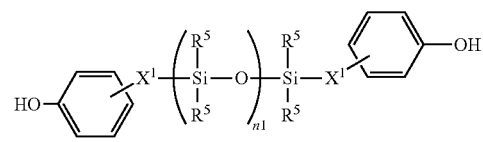

[Chemical Formula 3-1]

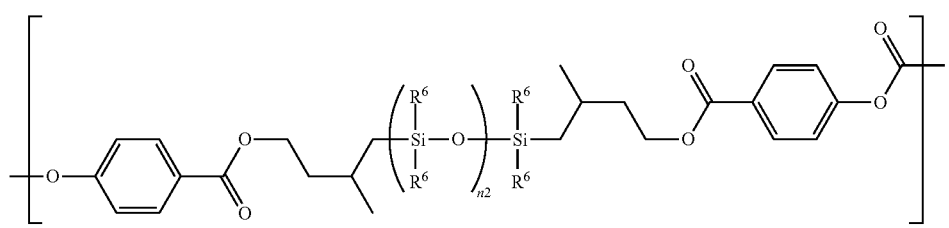

in Chemical Formula 2-2, $X^1$, $R^5$ and n1 are each the same as defined in Chemical Formula 2 above; and

[Chemical Formula 3-2]

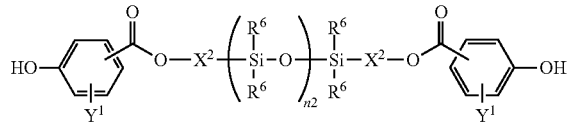

in Chemical Formula 3-2, $X^2$, $Y^1$, $R^6$ and n2 are each the same as defined in Chemical Formula 3 above.

The description 'derived from a siloxane compound' means that a hydroxy group of each of the siloxane compounds and a carbonate precursor are reacted to form the repeating unit represented by Chemical Formula 2 and the repeating unit represented by the Chemical Formula 3, respectively. Further, descriptions of the carbonate precursors that may be used for the formation of the repeating units represented by Chemical Formulas 2 and 3 are the same as that described for the carbonate precursor that may be used for the formation of the repeating unit represented by Chemical Formula 1 described above.

In addition, the compound represented by Chemical Formula 2-2 and the compound represented by Chemical Formula 3-2 may be prepared by Reaction Schemes 1 and 2 below, respectively:

[Reaction Scheme 1]

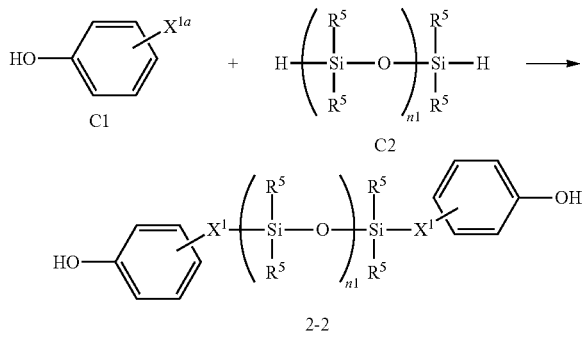

in Reaction Scheme 1, $X^{1a}$ is $C_{2-10}$ alkenyl, $X^1$, $R^5$ and n1 are each the same as defined in Chemical Formula 2 above; and

[Reaction Scheme 2]

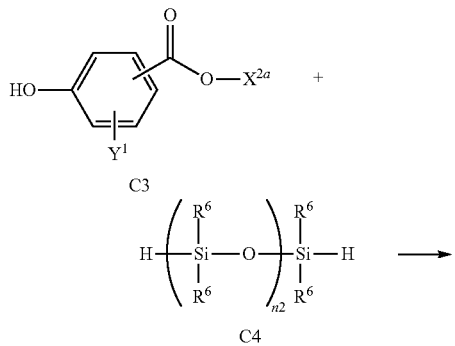

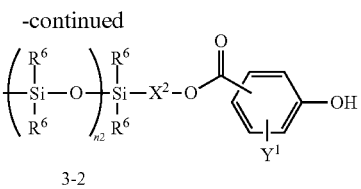

in Reaction Scheme 2, $X^{2a}$ is $C_{2-10}$ alkenyl, and $X^2$, $Y^1$, $R^6$ and n2 are each the same as defined in Chemical Formula 3 above.

In Reaction Scheme 1 and Reaction Scheme 2, the reactions may be preferably conducted in the presence of a metal catalyst. As the metal catalyst, a platinum (Pt) catalyst may be preferably used. The Pt catalyst may include at least one selected from the group consisting of Ashby catalyst, Karstedt catalyst, Lamoreaux catalyst, Speier catalyst, $PtCl_2$ (COD), $PtCl_2$(benzonitrile)$_2$, and $H_2PtBr_6$. The metal catalyst may have a content of 0.001 parts by weight or more, 0.005 parts by weight or more, or 0.01 parts by weight or more, and 1 part by weight or less, 0.1 parts by weight or less, or 0.05 parts by weight or less, based on 100 parts by weight of the compound represented by Chemical Formula 11, 13, or 15.

Further, the reaction temperature is preferably 80° C. to 100° C. In addition, the reaction time is preferably 1 to 5 hours.

In addition, in Reaction Schemes 1 and 2, the compound represented by Chemical Formula C2 or C4 may be prepared by a reaction of organodisiloxane and organocyclosiloxane in the presence of an acid catalyst, and n1 and n2 may be controlled by controlling contents of the reaction materials. The reaction temperature is preferably 50° C. to 70° C. In addition, the reaction time is preferably 1 to 6 hours.

As the organodisiloxane, at least one selected from the group consisting of tetramethyldisiloxane, tetraphenyldisiloxane, hexamethyldisiloxane and hexaphenyldisiloxane may be used. Further, the organocyclosiloxane may be, for example, organocyclotetrasiloxane. Examples of the organocyclotetrasiloxane may include octamethylcyclotetrasiloxane and octaphenylcyclotetrasiloxane, etc.

The organodisiloxane may have a content of 0.1 parts by weight or more, or 2 parts by weight or more, and 10 parts by weight or less, 8 parts by weight or less, based on 100 parts by weight of the organocyclosiloxane.

As the acid catalyst, at least one selected from the group consisting of $H_2SO_4$, $HClO_4$, $AlCl_3$, $SbCl_5$, $SnCl_4$, and acidic white clay may be used. In addition, the acid catalyst may have a content of 0.1 parts by weight or more, 0.5 parts by weight or more, 1 part by weight or more, and 10 parts by weight or less, 5 parts by weight or less, or 3 parts by weight or less, based on 100 parts by weight of the organocyclosiloxane.

Physical properties of the copolycarbonate resin may be improved by controlling the contents of the repeating units represented by Chemical Formulas 2 and 3. Here, the weight ratio of the repeating units corresponds to a weight ratio of the siloxane compounds used for polymerization of the copolycarbonate, for example, the siloxane compounds represented by Chemical Formulas 2-2 and 3-2 above.

[Composition and Preparation Method of Copolycarbonate Resin]

In the copolycarbonate resin, the aromatic polycarbonate-based first repeating unit and the aromatic polycarbonate-based second repeating unit having one or more siloxane bonds may have a molar ratio of 1:0.0001 to 1:0.01, or 1:0.0005 to 1:0.008, or 1:0.001 to 1:0.006, and a weight ratio of 1:0.001 to 1:1, or 1:0.005 to 1:0.1, or 1:0.01 to 1:0.03.

In addition, the copolycarbonate resin may include 90 to 99.999 wt % of the first repeating unit and 0.001 to 10 wt % of the second repeating unit.

That is, when the content of the second repeating unit is excessively decreased, it may be difficult to sufficiently implement improvement in physical properties such as room temperature impact strength, low temperature impact strength, chemical resistance, and fluidity according to the second repeating unit. Meanwhile, when the content of the second repeating unit is excessively increased, flowability and molding processability may be decreased while excessively increasing the molecular weight of the copolycarbonate resin.

In addition, the copolycarbonate resin may have a weight average molecular weight of 1,000 to 100,000 g/mol, preferably 5,000 to 50,000 g/mol. A suitable ductility and YI of the copolycarbonate resin may be ensured within the weight average molecular weight range. More preferably, the weight average molecular weight (g/mol) is 1,000 or more, 5,000 or more, 10,000 or more, 21,000 or more, 22,000 or more, 23,000 or more, 24,000 or more, 25,000 or more, 26,000 or more, 27,000 or more, or 28,000 or more. In addition, the weight average molecular weight is 100,000 or less, 50,000 or less, 34,000 or less, 33,000 or less, or 32,000 or less.

Further, a content of the copolycarbonate resin may vary depending on physical properties of the composition to be controlled. For example, the copolycarbonate resin may have a content of 30 to 93 wt %, based on the total content of the resin composition of an exemplary embodiment of the present invention. In a more specific example, when the resin composition of an exemplary embodiment includes only the copolycarbonate resin as the base resin, the copolycarbonate resin may have a content of 80 to 93 wt %, or 85 to 93 wt %, and when the resin composition includes a polycarbonate resin (a general aromatic polycarbonate resin) to be described below together with the above-described copolycarbonate resin as the base resin, the copolycarbonate resin may have a content of 30 to 70 wt %, or 30 to 65 wt %.

That is, it is preferred that the copolycarbonate resin is included in a content of 30 wt % or more based on the total resin composition in order to exhibit the above-described effect of improving physical property such as impact resistance, chemical resistance, or the like. However, when the copolycarbonate resin is added in an excess content, the transparency of the resin composition may be deteriorated, and the effect of improving heat resistance and impact strength may reach a threshold value or may be rather deteriorated. In this respect, the copolycarbonate resin may have a content of 93 wt % or less.

Meanwhile, the above-described copolycarbonate resin may be prepared by using the above-described aromatic diol compound, the carbonate precursor, and one or more siloxane compounds.

At the time of polymerization of these compounds, the one or more siloxane compounds may have a content of 0.1 wt % or more, 0.5 wt % or more, 1 wt % or more, 1.5 wt % or more, and 20 wt % or less, 10 wt % or less, 7 wt % or less, 5 wt % or less, 4 wt % or less, 3 wt % or less, or 2 wt % or less, based on the total content (100 wt %) of the aromatic diol compound, the carbonate precursor, and the one or more siloxane compounds. Further, the aromatic diol compound may have a content of 40 wt % or more, 50 wt % or more, or 55 wt % or more, and 80 wt % or less, 70 wt % or less, or 65 wt % or less, based on the total content (100 wt %) of the aromatic diol compound, the carbonate precursor, and the one or more siloxane compounds. In addition, the carbonate precursor may have a content of 10 wt % or more, 20 wt % or more, or 30 wt %, and 60 wt % or less, 50 wt % or less, or 40 wt % or less, based on the total content (100 wt %) of the aromatic diol compound, the carbonate precursor, and the one or more siloxane compounds.

In addition, as the polymerization method, an interfacial polymerization method may be used as one example. In this case, the polymerization reaction may be performed at a low temperature under an atmospheric pressure, and may easily control a molecular weight. The interfacial polymerization may be preferably conducted in the presence of an acid binder and an organic solvent. Furthermore, the interfacial polymerization may include, for example, steps of conducting pre-polymerization, and adding a coupling agent and conducting polymerization again. In this case, a copolycarbonate having a high molecular weight may be obtained.

The materials used in the interfacial polymerization are not particularly limited as long as they may be used in polymerization of polycarbonates. The used content thereof may be controlled as required.

The acid binder may include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. As one example, halogenated hydrocarbons such as methylene chloride, chlorobenzene, etc., may be used.

Further, in the interfacial polymerization, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the reaction.

In the interfacial polymerization, the reaction temperature may be preferably 0 to 40° C., and the reaction time may be preferably 10 minutes to 5 hours. Further, during the interfacial polymerization reaction, pH may be preferably maintained at 9 or more, or 11 or more.

In addition, the interfacial polymerization may be performed by further including a molecular weight regulator. The molecular weight regulator may be added before the initiation of polymerization, during the initiation of polymerization, or after the initiation of polymerization.

As the molecular weight regulator, mono-alkyl phenol may be used. As one example, the mono-alkyl phenol is at least one selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol and triacontyl phenol. Preferably, the mono-alkyl phenol may be p-tert -butylphenol, and in this case, the effect of controlling the molecular weight is great.

The molecular weight regulator may have, for example, a content of 0.01 parts by weight or more, 0.1 parts by weight or more, or 1 part by weight or more, and 10 parts by weight or less, 6 parts by weight or less, or 5 parts by weight or less, based on 100 parts by weight of the aromatic diol compound. Within the range as described above, a desired molecular weight may be obtained.

(2) Polycarbonate Resin

The resin composition of an exemplary embodiment may include only the above-described copolycarbonate resin as the base resin, but may further include a general polycarbonate resin as the base resin in consideration of specific usages, products, or a level of physical properties to be required, etc. The polycarbonate resin includes the aromatic polycarbonate-based first repeating unit, which may be distinguished from the above-described copolycarbonate resin in that the polycarbonate resin does not have an aromatic polycarbonate-based repeating unit having a siloxane bond (for example, the above-described second repeating unit).

Specifically, the aromatic polycarbonate-based first repeating unit is formed by a reaction of a diol compound and a carbonate precursor, and suitably, may include a repeating unit represented by Chemical Formula 1 below, and a structure of the repeating unit may be the same as or different from the first repeating unit included in the above-described copolycarbonate resin:

[Chemical Formula 1]

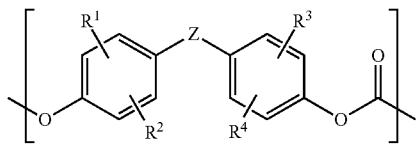

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, $R^1$ to $R^4$ are each independently hydrogen, methyl, chloro, or bromo.

In addition, preferably, Z is a linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenylmethylene. In addition, preferably, Z is cyclohexane-1,1-diyl, O, S, SO, $SO_2$, or CO.

As non-limiting examples, the repeating unit represented by Chemical Formula 1 may be derived from one or more aromatic diol compounds selected from the group consisting of bis(4-hydroxyphenyl)methane, bis(4-hydroxyphenyl) ether, bis(4-hydroxyphenyl)sulfone, bis(4-hydroxyphenyl) sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl) cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

The description 'derived from the aromatic diol compound' means that a hydroxy group of the aromatic diol compound and the carbonate precursor are reacted to form the repeating unit represented by Chemical Formula 1.

As non-limiting example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

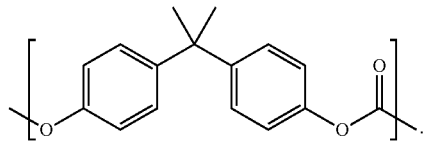

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromophosgene, and bishaloformate may be used. Preferably, triphosgene or phosgene may be used.

The polycarbonate resin may have a weight average molecular weight of 1,000 to 100,000 g/mol, preferably 5,000 to 50,000 g/mol. More preferably, the weight average molecular weight (g/mol) is 1,000 or more, 5,000 or more, 10,000 or more, 21,000 or more, 22,000 or more, 23,000 or more, 24,000 or more, 25,000 or more, 26,000 or more, 27,000 or more, or 28,000 or more. In addition, the weight average molecular weight is 100,000 or less, 50,000 or less, 34,000 or less, 33,000 or less, or 32,000 or less.

In addition, it may be preferred in view of stable expression of physical properties of the composition that the polycarbonate resin has a melt index (MI) of 5 g/10 min to 25 g/10 min according to ASTM D1238 (measured for 10 minutes at a temperature of 300° C. and under a load of 1.2 kg). In an example, the polycarbonate resin may be at least one selected from a resin having a melt index (MI) of 5 g/10 min to 15 g/10 min and a resin having a melt index (MI) of 16 g/10 min to 25 g/10 min.

The above-described polycarbonate resin may be synthesized directly according to a well-known synthesis method of a general aromatic polycarbonate resin, or may be commercially available aromatic polycarbonate.

Further, a content of the polycarbonate resin may vary depending on physical properties of the composition to be controlled. For example, the polycarbonate resin may have a content of 0 to 65 wt %, or 30 to 70 wt %, based on the total content of the resin composition of an exemplary embodiment of the present invention. Such a polycarbonate resin is a component that is included only when the copolycarbonate resin which is the basic base resin is necessary together, wherein when the content thereof is excessively increased, a content of the copolycarbonate resin is relatively decreased, and thus, the impact resistance or the chemical resistance of the resin composition may not be sufficient. Further, when the content of the polycarbonate resin is excessively decreased, a purpose according to the addition thereof may not be achieved properly.

(3) Glass Fiber

Meanwhile, the resin composition of an exemplary embodiment includes the glass fiber to reinforce rigidity, etc. By using the glass fiber, tensile/flexural strength, tensile/flexural modulus, and heat resistance, etc., of the resin composition may be improved. However, when the glass fiber is used in an excessively high content, problems such as protrusion of the glass fiber, etc., may occur, and thus, the resin composition of an exemplary embodiment may improve impact strength, chemical resistance, and other general physical properties, etc., of the resin composition by using the above-described copolycarbonate resin, and may include the glass fiber in a relatively decreased content.

As the glass fiber, any glass fiber previously known to be usable for improvement of physical properties of the polycarbonate-based resin composition, etc., may be used without any particular limitation. For example, a cocoon glass fiber or a flat glass fiber may be used.

More specifically, the glass fiber may have a rectangular, circular or elliptical cross section in a direction perpendicular to a longitudinal direction, and may have an aspect ratio according to Equation 1 below of 50 to 500. In addition, the glass fiber may have a length (L) of 2 to 5 mm, and a length of the long side or a length of a (long) diameter (D) of 5 to 40 μm:

$$\text{Aspect Ratio } (\delta) = L/D \qquad [\text{Equation 1}]$$

in Equation 1, L is a length of the glass fiber, D is a length of the longest side of the rectangular cross section, a length of a diameter of the circular cross section, or a length of the longest diameter of the elliptical cross section.

In a more specific example, a glass fiber having a length (L) of 2 to 5 mm, a rectangular cross section, a length of the longest side (for example, a width of the glass fiber cross section; D) of 20 to 40 μm, and an aspect ratio of 50 to 200 as defined by Equation 1 above may be used as the glass fiber. In another more specific example, a glass fiber having a length (L) of 2 to 5 mm, a circular cross section or an elliptical cross section, or a length (D) of (the longest) diameter of 5 to 15 μm, and an aspect ratio of 200 to 500 as defined by Equation 1 above may be used as the glass fiber.

By using the glass fiber, rigidity and toughness of the resin composition of an exemplary embodiment may be suitably improved. This is because the glass fiber having the above-described structural characteristic may control a suitable binding force between the resin and the glass fiber, thereby appropriately absorbing external impact through a space of the resin and the glass fiber.

When the glass fiber has an excessively decreased aspect ratio, it is not preferred since the resin composition and the molded article of an exemplary embodiment may be brittle, and when the glass fiber has an excessively increased aspect ratio, a possibility of surface protrusion of the glass fiber may be high, and thus, surface smoothness, and a product appearance, etc., may be deteriorated, and toughness and impact strength, etc., of the molded article may be deteriorated.

Meanwhile, as the glass fiber, a glass fiber surface-coated with a silane-based compound may be used, and more specifically, a glass fiber surface-coated with a compound having an olefin silane group, a urethane silane group, or an epoxy silane group may be used. For example, when the glass fiber is surface-coated with a compound having an epoxy silane group, the epoxy group, etc., included therein may be chemically bonded to a functional group of other components, and thus, rigidity, chemical resistance, or the like, of the resin composition and the molded article of an exemplary embodiment may be further improved. Therefore, in consideration of specific use for which the resin composition of an exemplary embodiment is intended to be used and physical properties to be further improved, etc., the glass fiber surface-coated with the epoxy silane group (epoxy silane-based compound) may be more preferably selected and used.

As the silane-based compound, for example, a compound having an olefin silane group, an epoxy silane group, or a urethane silane group, all conventional compound previously used for surface coating of the glass fiber may be used without any particular limitation. Alternatively, a commercially available glass fiber itself which is surface-coated with the silane-based compound may be obtained and used.

The glass fiber may have a content of 1 to 40 wt %, or 3 to 35 wt %, or 5 to 30 wt %, based on the total content of the resin composition of an exemplary embodiment. When the content of the glass fiber is excessively increased, surface smoothness or appearance characteristic, etc., of the molded product may be deteriorated due to protrusion of the glass fiber, etc. On the contrary, when the content of the glass fiber is excessively decreased, strength, etc., of the resin composition and the molded article of an exemplary embodiment may not be sufficient.

(4) Impact-reinforcing Agent

The resin composition of an exemplary embodiment further includes an impact-reinforcing agent in addition to the above-described respective components. The impact-reinforcing agent may include a rubber-modified vinyl-based graft copolymer to appropriately reinforce the impact strength of the resin composition in an exemplary embodiment and the molded article thereof.

The rubber-modified vinyl-based graft copolymer may be a graft copolymer having a core-shell structure in which a vinyl-based unsaturated monomer is grafted to a core structure to form a shell, the core structure including at least one rubber selected from the group consisting of diene-based rubber, acrylate-based rubber, and silicone-based rubber, and it was confirmed that the impact-reinforcing agent may be used in the resin composition of an exemplary embodiment to more appropriately reinforce the impact strength, etc.

In the impact-reinforcing agent in a form of the graft copolymer, the rubber may be at least one of C4-C6 diene-based rubber, acrylate-based rubber, silicone-based rubber, etc., and more suitably, silicone-based rubber, acrylate-based rubber or silicone-acrylate-based rubber in view of structural stability of the impact-reinforcing agent.

In a more specific example, the acrylate-based rubber may be rubber formed from (meth)acrylate monomers such as methyl(meth)acrylate, ethyl(meth)acrylate, n-propyl(meth)acrylate, n-butyl(meth)acrylate, 2-ethylhexyl(meth)acrylate, hexyl(meth)acrylate, etc., and a curing agent such as ethyleneglycol di(meth)acrylate, propyleneglycol di(meth)acrylate, 1,3-butyleneglycol di(meth)acrylate, 1,4-butyleneglycol di(meth)acrylate, allyl(meth)acrylate, triallyl cyanurate, or the like, may be further used to form the rubber.

In addition, the silicone-based rubber may be used by being prepared from cyclosiloxane, and specific examples thereof may include silicone-based rubbers prepared from at least one selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. In order to form the silicone-based rubber, a curing agent such as trimethoxymethylsilane, triethoxyphenylsilane, tetramethoxysilane, tetraethoxysilane, or the like, may be further used.

In addition, in the above-described impact-reinforcing agent, the vinyl-based unsaturated monomer grafted to the rubber may be at least one of an aromatic vinyl-based monomer, a monomer copolymerizable with the aromatic vinyl-based monomer, etc.

The aromatic vinyl monomer may include styrene, α-methylstyrene, β-methylstyrene, p-methylstyrene, para-t-butylstyrene, ethylstyrene, etc. These monomers may be used alone or in combination of at least two. In addition, the monomer copolymerizable with the aromatic vinyl monomer may include a vinyl cyanide compound, C1-C12 alkyl (meth)acrylate, (meth)acrylate, C1-C12 alkyl or phenyl nucleus-substituted maleimide, etc. These monomers may be used alone or in combination of at least two.

The above-described impact-reinforcing agent in a form of the rubber-modified vinyl-based graft copolymer may be synthesized directly according to methods well-known to those skilled in the art, or may be commercially available.

In addition, the above-described impact-reinforcing agent may have a content of 1 to 20 wt %, or 1.2 to 10 wt %, or 1 to 5 wt %, based on the total content of the resin composition of an exemplary embodiment. When the content of the impact-reinforcing agent is excessively increased, an additional effect of improving the impact strength may not be substantially exhibited, and it may be difficult for the resin composition of an exemplary embodiment to exhibit excellent flame retardancy. On the contrary, when the content of the impact-reinforcing agent is excessively decreased, the impact resistance of the resin composition and the molded article of an exemplary embodiment, such as impact strength, etc., may not be sufficient.

(5) Other Component

Meanwhile, the resin composition according to an exemplary embodiment may further include an epoxy silane-based additive in addition to the above-described respective components. The epoxy silane-based additive may include bivalent or higher epoxy and silane groups, for example, bivalent to nonavalent epoxy and silane groups to interact (chain extension or coupling) with the base resin, and thus, chemical resistance and other general physical properties of the resin composition and the molded article of an exemplary embodiment may be further improved.

The epoxy silane-based additive may be used by directly synthesizing a compound having a polyvalent epoxy group and a polyvalent silane group, or by obtaining commercially available components.

The epoxy silane-based additive may have a content of 0.1 to 3 wt %, or 0.2 to 2 wt %, based on the total content of the resin composition of an exemplary embodiment. When the content of the additive is excessively large, a reaction between the base resin of the copolycarbonate resin or the polycarbonate resin and the additive is excessively and largely generated at the time of injecting the resin composition into the molded article, moldability/processability may be deteriorated. On the contrary, when the content of the additive is excessively small, improvement in chemical resistance, etc., due to the use of the additive may not be substantially exhibited.

Meanwhile, the above-described resin composition according to an exemplary embodiment may further include additives, for example, a drip inhibitor such as polytetrafluoroethylene (PTFE); a surfactant; a nucleating agent; a coupling agent; a filler; a plasticizer; a lubricant; an antimicrobial agent; a release agent; a heat stabilizer; an antioxidant; a UV stabilizer; a compatibilizer; a coloring agent; an antistatic agent; pigment; dye; a flame resistant, etc., if necessary.

The content of the additive may vary depending on physical properties to be exhibited in the composition. For example, the additive may have a content of 0.01 to 10 parts by weight, respectively, based on 100 parts by weight of the polycarbonate resin.

However, it is preferred that the total content of the additive is suitably 20 parts by weight or less, or 15 parts by weight or less, or 10 parts by weight or less based on 100 parts by weight of the polycarbonate resin, in order to prevent the heat resistance, the impact strength and the chemical resistance, etc., of the polycarbonate-based resin composition from being deteriorated by the application of the additive.

II. Polycarbonate-based Resin Molded Article

According to another exemplary embodiment of the present invention, there is provided a molded article including the above-described polycarbonate-based resin composition.

The molded article is an article obtained by molding the above-described polycarbonate-based resin composition as raw materials through a method such as extrusion, injection-molding, casting, etc.

A molding method and conditions thereof may be appropriately selected and controlled according to kinds of the molded article.

As a non-limiting example, the molded article may be obtained by mixing and extrusion molding the polycarbonate resin-based composition to prepare pellets, and then, drying and injecting the pellet.

In particular, since the molded article is formed from the polycarbonate-based resin composition, mechanical properties such as rigidity, etc., impact strength, and chemical resistance, etc., may be excellent.

The polycarbonate-based resin composition according to the present invention and the molded article thereof may exhibit improved impact strength (impact resistance), chemical resistance, and excellent mechanical properties such as rigidity, etc., while including the glass fiber in a relatively small content.

MODE FOR INVENTION

Hereinafter, preferable Examples of the present invention will be provided for better understanding of the present invention. However, the following Examples are provided only for illustration of the present invention, and should not be construed as limiting the present invention by the examples.

Preparation Example 1

Preparation of Polyorganosiloxane (AP-PDMS, n=34)

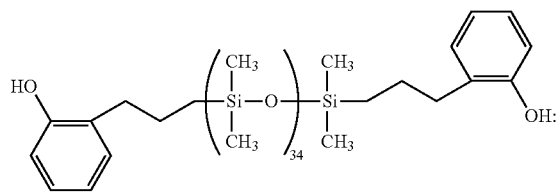

After 47.6 g (160 mmol) of octamethylcyclotetrasiloxane and 2.4 g (11 mmol) of tetramethyldisiloxane were mixed with each other, the mixture was placed in a 3L flask with 1 part by weight of acidic white clay (DC-A3) based on 100 parts by weight of octamethylcyclotetrasiloxane, and reacted at 60 for 4 hours. After the reaction was terminated, the mixture was diluted with ethylacetate and quickly filtered using a celite. The repeating unit (n1) of the unmodified polyorganosiloxane obtained as described above was 34 when confirmed through $^1$H NMR.

4.81 g (35.9 mmol) of 2-allylphenol and 0.01 g (50 ppm) of Karstedt's platinum catalyst were added to the obtained terminal-unmodified polyorganosiloxane and reacted at 90° C. for 3 hours. After the reaction was terminated, the unreacted siloxane was removed by evaporation under condition of 120° C. and 1 torr. The terminal-modified polyorganosiloxane obtained as described above was designated as AP-PDMS (n1=34). AP-PDMS was pale yellow oil, the repeating unit (n1) was 34 when confirmed through $^1$H NMR using Varian 500 MHz, and further purification was not required.

Preparation Example 2

Preparation of polyorganosiloxane (MBHB-PDMS, n2=58)

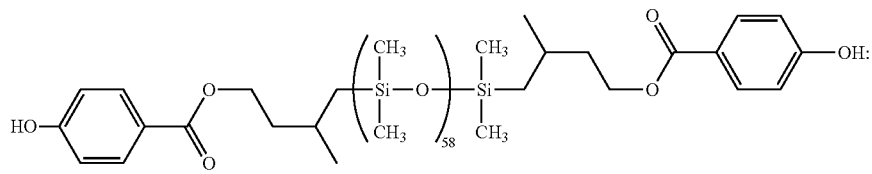

After 47.60 g (160 mmol) of octamethylcyclotetrasiloxane and 1.5 g (11 mmol) of tetramethyldisiloxane were mixed with each other, the mixture was placed in a 3L flask with 1 part by weight of acidic white clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (n2) of the terminal-unmodified polyorganosiloxane obtained as described above was 58 when confirmed through $^1$H NMR.

6.13 g (29.7 mmol) of 3-methylbut-3-enyl 4-hydroxybenzoate and 0.01 g (50 ppm) of Karstedt's platinum catalyst were added to the obtained terminal-unmodified polyorganosiloxane and reacted at 90° C. for 3 hours. After the reaction was terminated, the unreacted siloxane was removed by evaporation under condition of 120° C. and 1 torr. The terminal-modified polyorganosiloxane obtained as described above was designated as MBHB-PDMS (n2=58). MBHB-PDMS was pale yellow oil, the repeating unit (n2) was 58 when confirmed through $^1$H NMR using Varian 500 MHz, and further purification was not required.

Preparation Example 3

Preparation of Copolycarbonate Resin:

1784 g of water, 385 g of NaOH and 232 g of bisphenol A (BPA) were added to a polymerization reactor, and dissolved with mixing under $N_2$ atmosphere. To the above-prepared mixture, 4.3 g of para-tert butylphenol (PTBP) and a mixed solution of 4.72 g of AP-PDMS (n1=34) prepared by Preparation Example 1 and 0.52 g of MBHB-PDMS (n2=58) prepared by Preparation Example 2 dissolved in methylene chloride (MC) were added. Subsequently, 128 g of triphosgene (TPG) was dissolved in MC and the dissolved TPG solution was added to the mixture and reacted for 1 hour while maintaining pH at 11 or more. After 10 minutes, 46 g of triethylamine (TEA) was added thereto to perform a coupling reaction. After a total reaction time of 1 hour and 20 minutes, TEA was removed by lowering the pH to 4, and then the produced polymer was washed three times with distilled water so that pH was adjusted to neutral pH of 6 to 7. The obtained polymer was re-precipitated in a mixed solution of methanol and hexane, and dried at 120° C. to finally obtain a copolycarbonate resin (Mw=30,500).

Examples and Comparative Examples

Respective components were added according to composition shown in Table 1 below, followed by melting and kneading-extrusion, thereby preparing pellets. The prepared pellets were dried at 70° C. for 6 hours, followed by injection-molding, to manufacture specimens for evaluating physical properties.

The components used in respective Examples and Comparative Examples are as follows.

(A) Copolycarbonate resin (PC 8000-05, LG Chem.) according to Preparation Example 3 above (B) Bisphenol A polycarbonate resin (PC)

The polycarbonate resin is a polymer of bisphenol A, and a melt index (MI) thereof was measured with a weight (g) measured for 10 minutes at a temperature of 300| and under a load of 1.2 kg according to ASTM D1238. As a result of the measurement, an aromatic polycarbonate resin having a melt index of 10 g/10 min and manufactured by LG Chem., was used.

(C) Glass fiber (C-1) A glass fiber that had a width (D) of 28 μm, a thickness of 7 μm, a length (L) of 3 mm, and an aspect ratio (δ) calculated by Equation 1 of 107, and was surface-treated with an epoxy silane-based compound and manufactured by Nittobo was used.

(C-2) A glass fiber that had a diameter (D) of 10 to 13 μm, a length (L) of 4 mm, and an aspect ratio (δ) calculated by Equation 1 of 308 to 400, and was surface-treated with an epoxy silane-based compound and manufactured by Owens Corning was used.

(D) Metablen S-2100 using a silicone-acrylate rubber manufactured by MRC in Japan was used as the impact-reinforcing agent of the rubber-modified vinyl-based graft copolymer.

(E) Epoxy silane-based additive (E-1) Joncryl ADR 4370-F manufactured by BASF was used.

(E-2) Silquest A-187 manufactured by Momentive was used.

TABLE 1

|   | Example 1 (wt %) | Example 2 (wt %) | Example 3 (wt %) | Example 4 (wt %) | Example 5 (wt %) | Example 6 (wt %) | Comparative Example 1 (wt %) | Comparative Example 2 (wt %) |
|---|---|---|---|---|---|---|---|---|
| A | 30 | 30 | 30 | 92.8 | 30 | 30 | 30 | — |
| B | 62.8 | 62 | 37.8 | — | 62.8 | 62.8 | 67.8 | 92.8 |
| C-1 | 5 | 5 | 30 | 5 | 5 | — | — | 5 |
| C-2 | — | — | — | — | — | 5 | — | — |
| D | 2 | 2 | 2 | 2 | 2 | 2 | 2 | 2 |
| E-1 | 0.2 | 1 | 0.2 | 0.2 | — | 0.2 | 0.2 | 0.2 |
| E-2 | — | — | — | — | 0.2 | — | — | — |

Experimental Example

Physical properties of each specimen formed from each composition of Examples and Comparative Examples were measured by the following methods, and results thereof were shown in Table 2 below.

(1) Tensile strength: measured at 23° C. according to ASTM D638 using Instron UTM having a speed of 5 mm/sec.

(2) Flexural strength/Flexural modulus: measured at 23° C. according to ASTM D790.

(3) Impact strength (IZOD): measured at a temperature of 23° C. with ⅛ inch (Notched Izod, J/m) according to ASTM D256.

(4) Chemical resistance: the composition was pelletized using a twin-screw extruder attached with a vent of Φ40 mm, and was subjected to injection-molding at a cylinder temperature of 300° C. and a mold temperature of 80° C. DeletedTextsusing a N-20C injection molding machine (manufactured by JSW, Ltd.), thereby manufacturing each specimen. Eight points of the specimen having a smartphone size were designated, and were applied by spraying a liquid type sun screen (NIVEA Aqua Protect Sun Spray) for 0.5 seconds per each point. After the application, crack occurrence time was observed for 24 hours. Table 2 below showed chemical resistance evaluation results that were summarized with time at which crack occurrence began to be observed (time at which cracks began to occur at any of eight points), and when the crack occurrence was not observed for 24 hours, it was indicated as "NC (No Crack)".

Referring to Table 2, it was confirmed that the molded articles of Examples exhibited strength and modulus equal to or higher than those of Comparative Examples and exhibited more excellent chemical resistance than those of Comparative Examples. In particular, it was confirmed that upon companion between Examples and Comparative Example 2, the impact strength was more improved in Examples when the same content of the glass fiber was included.

The invention claimed is:

1. A polycarbonate-based resin composition comprising:
   a copolycarbonate resin including an aromatic polycarbonate-based first repeating unit, and an aromatic polycarbonate-based second repeating unit having one or more siloxane bonds,
   a glass fiber, and
   an impact-reinforcing agent including a rubber-modified vinyl-based graft copolymer,
   wherein the first repeating unit includes a repeating unit represented by Chemical Formula 1 below, and;
   the second repeating unit includes at least one repeating unit selected from the group consisting of Chemical Formula 3 below, and
   wherein the glass fiber has a rectangular, circular or elliptical cross section in a direction perpendicular to a longitudinal direction, and has an aspect ratio according to Equation 1 below of 50 to 500:

Aspect ratio($\delta$)=L/D  [Equation 1]

in Equation 1, L is a length of the glass fiber, D is a length of the longest side of the rectangular cross section, a length of a diameter of the circular cross section, or a length of the longest diameter of the elliptical cross section,

TABLE 2

|  | Example 1 | Example 2 | Example 3 | Example 4 | Example 5 | Example 6 | Comparative Example 1 | Comparative Example 2 |
|---|---|---|---|---|---|---|---|---|
| Tensile Strength (kg/cm2) | 680 | 700 | 1200 | 680 | 670 | 680 | 560 | 700 |
| Flexural Strength (kg/cm2) | 1100 | 1200 | 1600 | 1100 | 1100 | 1100 | 900 | 1100 |
| Flexural Modulus (Kg/cm2) | 30000 | 32000 | 75000 | 30000 | 30000 | 30000 | 23000 | 30000 |
| Impact Strength (kgcm/cm) | 20 | 20 | 15 | 20 | 23 | 20 | 20 | 18 |
| Chemical Resistance (Time) | NC | NC | NC | NC | NC | NC | 0.5 | 5 |

[Chemical Formula 1]

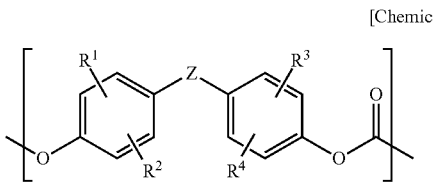

in Chemical Formula 1,
$R^1$ to $R^4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO;

[Chemical Formula 3]

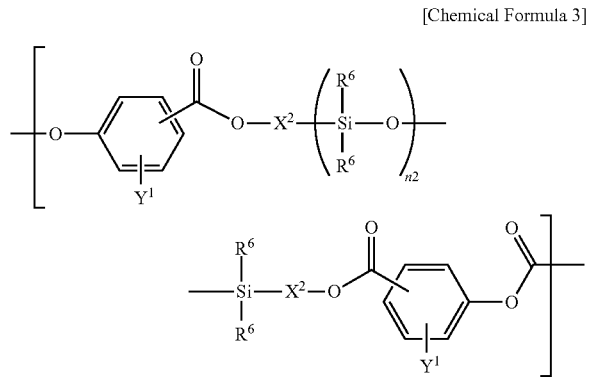

in Chemical Formula 3,
$X^2$ is each independently $C_{1-10}$ alkylene,
$Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n2 is an integer of 10 to 200.

2. The polycarbonate-based resin composition of claim 1, further comprising: a polycarbonate resin including the aromatic polycarbonate-based first repeating unit represented by Chemical Formula 1.

3. The polycarbonate-based resin composition of claim 1, wherein: the second repeating unit further includes at least one repeating unit selected from the group consisting of Chemical Formula 2 below:

[Chemical Formula 2]

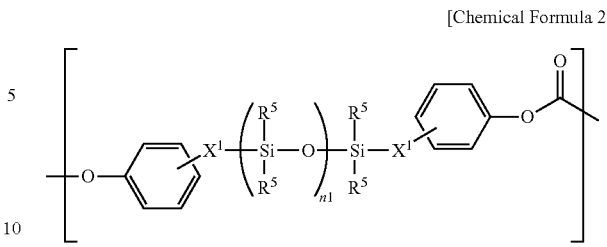

in Chemical Formula 2,
$X^1$ is each independently $C_{1-10}$ alkylene,
$R^5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n1 is an integer of 10 to 200.

4. The polycarbonate-based resin composition of claim 1, wherein:
the repeating unit represented by Chemical Formula 1 is represented by Chemical Formula 1-1 below:

[Chemical Formula 1-1]

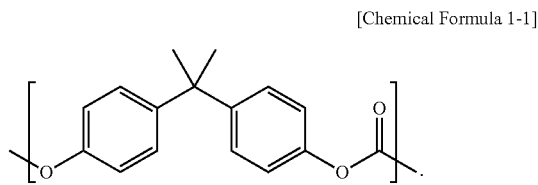

5. The polycarbonate-based resin composition of claim 1, wherein: the repeating unit represented by Chemical Formula 3 is represented by Chemical Formula 3-1 below:

[Chemical Formula 3-1]

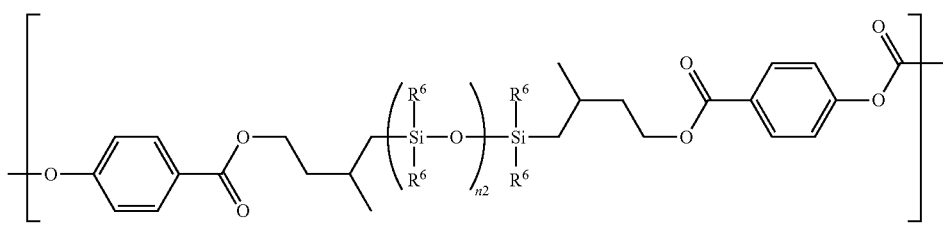

in Chemical Formula 3-1,
$R^6$ and n2 are each the same as defined in Chemical Formula 3 above.

6. The polycarbonate-based resin composition of claim 3, wherein: the repeating unit represented by Chemical Formula 2 is represented by Chemical Formula 2-1 below:

[Chemical Formula 2-1]

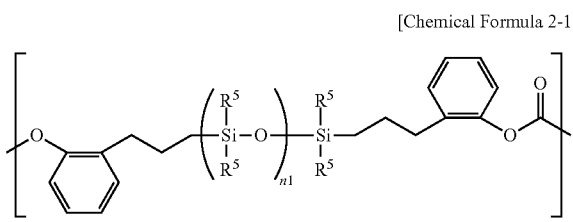

in Chemical Formula 2-1,
$R^5$ and n1 are each the same as defined in Chemical Formula 2 above.

7. The polycarbonate-based resin composition of claim 1, wherein: the copolycarbonate resin includes 90 to 99.999 wt % of the first repeating unit and 0.001 to 10 wt % of the second repeating unit.

8. The polycarbonate-based resin composition of claim 2, wherein: the polycarbonate resin has a melt index (MI) of 5 g/10 min to 25 g/10 min at a temperature of 300° C. and under a load of 1.2 kg.

9. The polycarbonate-based resin composition of claim 2, wherein: the polycarbonate resin and the copolycarbonate resin each have a weight average molecular weight of 1,000 to 100,000 g/mol.

10. The polycarbonate-based resin composition of claim 1, wherein:
the glass fiber has the length (L) of 2 to 5 mm, and the length (D) of 5 to 40 μm.

11. The polycarbonate-based resin composition of claim 1, wherein: the glass fiber is surface-coated with a silane-based compound.

12. The polycarbonate-based resin composition of claim 1, wherein: the rubber-modified vinyl-based graft copolymer is a graft copolymer having a core-shell structure in which a vinyl-based unsaturated monomer is grafted to a core structure to form a shell,
the core structure including at least one rubber selected from the group consisting of diene-based rubber, acrylate-based rubber, and silicone-based rubber.

13. The polycarbonate-based resin composition of claim 2, wherein:
the polycarbonate-based resin composition includes:
30 to 93 wt % of the copolycarbonate resin,
0 to 65 wt % of the polycarbonate resin,
1 to 40 wt % of the glass fiber, and
1 to 20 wt % of the impact-reinforcing agent.

14. The polycarbonate-based resin composition of claim 1, further comprising: an epoxy silane-based additive.

15. The polycarbonate-based resin composition of claim 14, wherein:
the epoxy silane-based additive is included in a content of 0.1 to 3 wt % based on the total resin composition.

16. A molded article comprising the polycarbonate-based resin composition of claim 1.

* * * * *